(12) United States Patent
Mozolewski

(10) Patent No.: US 10,291,693 B2
(45) Date of Patent: May 14, 2019

(54) REDUCING DATA IN A NETWORK DEVICE

(71) Applicant: HEWLETT PACKARD ENTERPRISE DEVELOPMENT LP, Houston, TX (US)

(72) Inventor: Mark Brian Mozolewski, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 124 days.

(21) Appl. No.: 15/117,248

(22) PCT Filed: Apr. 30, 2014

(86) PCT No.: PCT/US2014/036009
§ 371 (c)(1),
(2) Date: Aug. 8, 2016

(87) PCT Pub. No.: WO2015/167486
PCT Pub. Date: Nov. 5, 2015

(65) Prior Publication Data
US 2016/0352820 A1 Dec. 1, 2016

(51) Int. Cl.
*H04L 29/08* (2006.01)
*H04L 12/64* (2006.01)
*G06F 8/41* (2018.01)

(52) U.S. Cl.
CPC ........ *H04L 67/1008* (2013.01); *G06F 8/4441* (2013.01); *H04L 12/6418* (2013.01); *H04L 67/101* (2013.01); *H04L 67/34* (2013.01)

(58) Field of Classification Search
CPC . H04L 12/6418; H04L 67/10; H04L 67/1002; H04L 67/1008; H04L 67/101; H04L 67/34; G06F 8/4441; G06F 9/5066; G06F 11/3404; G06F 17/30914
USPC .......................................................... 709/202
See application file for complete search history.

(56) References Cited

U.S. PATENT DOCUMENTS

| 7,535,895 | B2 | 5/2009 | Medved et al. |
| 7,650,331 | B1 * | 1/2010 | Dean ..................... G06F 9/5066 712/203 |
| 8,385,202 | B2 | 2/2013 | Kuik et al. |
| 2011/0295855 | A1 | 12/2011 | Wang et al. |

(Continued)

FOREIGN PATENT DOCUMENTS

WO  WO-2013/162511 A1  10/2013

OTHER PUBLICATIONS

Andrew T. Campbell et al., "A Survey of Programmable Networks," Apr. 17, 1999, pp. 1-18, Available at: <ecs.umass.edu/ece/wolf/courses/ECE697J/Fall2002/papers/AN_survey_programmable_networks.pdf>.

(Continued)

*Primary Examiner* — Ruolei Zong
(74) *Attorney, Agent, or Firm* — Hewlett Packard Enterprise Patent Department

(57) ABSTRACT

Examples of reducing data in a network are disclosed. In one example implementation according to aspects of the present disclosure, method may include receiving, by a network device, data from a mapper system. The method may then include performing, by the network device, a reduction function on the data received from the mapper system to reduce the data. The method may also include transmitting, by the network device, the reduced data to a reducer system.

15 Claims, 4 Drawing Sheets

(56) References Cited

U.S. PATENT DOCUMENTS

| | | | |
|---|---|---|---|
| 2012/0151292 A1* | 6/2012 | Rowstron | G06F 9/5066 |
| | | | 714/748 |
| 2012/0173710 A1* | 7/2012 | Rodriguez | H04L 43/026 |
| | | | 709/224 |
| 2012/0182891 A1* | 7/2012 | Lee | H04L 43/04 |
| | | | 370/252 |
| 2012/0209943 A1 | 8/2012 | Jung | |
| 2012/0215920 A1 | 8/2012 | Doyle et al. | |
| 2012/0254193 A1 | 10/2012 | Biswapesh et al. | |
| 2013/0024412 A1* | 1/2013 | Gong | G06N 5/00 |
| | | | 706/46 |
| 2015/0180796 A1* | 6/2015 | Chu | H04L 47/70 |
| | | | 709/226 |
| 2015/0326644 A1* | 11/2015 | Yahalom | H04L 67/10 |
| | | | 709/202 |

OTHER PUBLICATIONS

Christopher Monsanto et al., "A Compiler and Run-time System for Network Programming Languages," POPL'12, Jan. 25-27, 2012, Philadelphia, PA, USA, pp. 1-14, ACM.

International Search Report and Written Opinion, International Application No. PCT/US2014/036009, dated Jan. 22, 2015, pp. 1-11, KIPO.

* cited by examiner

REDUCING DATA IN A NETWORK DEVICE

BACKGROUND

In the big data era with growing datasets to analyze, organizations are utilizing distributed programing models and distributed compute environments to take advantage of parallel processing with commodity servers. In these cases, large amounts of data may be transmitted among the servers across a network connecting the servers within the distributed compute environment.

BRIEF DESCRIPTION OF THE DRAWINGS

The following detailed description references the drawings, in which.

DETAILED DESCRIPTION

Figure 1:
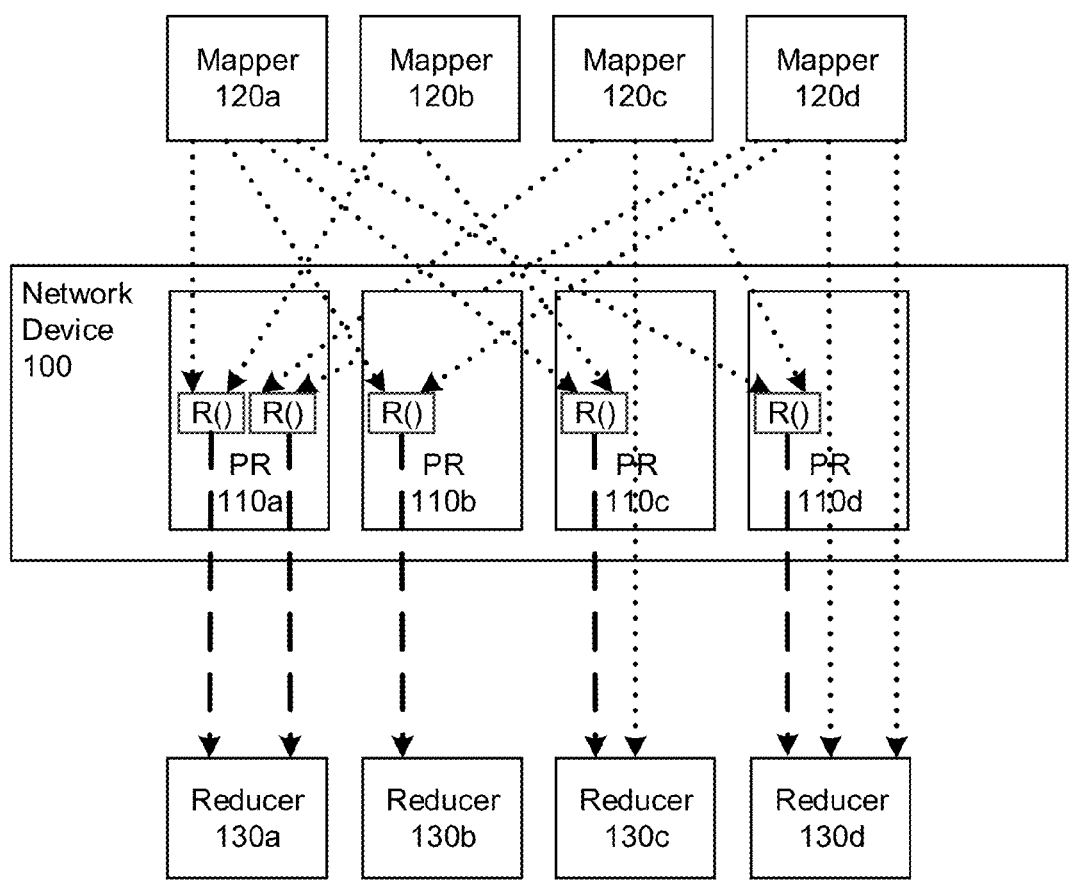
FIG. 1 illustrates a block diagram of a system having a network device to perform a reduction function according to examples of the present disclosure.

In the big data era, with growing datasets to analyze, organizations are utilizing distributed programing models and distributed compute environments and systems to take advantage of parallel processing with commodity servers. These parallel processing models transport large amounts of data, which can cause a bottleneck to distributed applications. An increasing number of physical network switches have the computational ability to inspect, process, and modify network traffic, as do virtual switches that are found in virtualized datacenters.

Datasets continue to grow as does the desire to run often increasingly complex data mining and analytical processing jobs on that data. From an end-user's perspective, the metric used to measure the performance of these distributed applications is usually job latency and throughput of analytic jobs processed by the system. At the same time, organizations are looking for ways to reduce the cost of their growing shared physical infrastructure (e.g., compute, network, power/cooling, etc.) by optimizing their use among many teams. The desire for a cluster (i.e., a number of computing systems networked together) to run additional and more complex analysis is pressuring the scalability of the clusters further, which is a direct and reoccurring cost to the implementing organization. Consequently, the performance of large-scale, parallel processing networks is a consideration for distributed applications.

Currently each network device or switch in the network of a distributed compute infrastructure is viewed as a cost point not only in terms of real capital for equipment and personnel to administer, but also in terms of the latency incurred during packet processing. Each switch is also viewed as a congestion and/or failure point in the data transport between compute nodes that are doing the real work of the application. Therefore, conventional network planning has attempted to minimize the number of network stages (hops) packets flow through to avoid these costs.

At the same time, network switches have evolved to process packets reliably at high rates. In an effort to add functionality and value, vendors of switches are adding programmable network processors (NPUs) and/or additional embedded CPUs to the normal packet datapath. These programmable elements provide for network-specific features to be applied to each packet at a high rate within the switch (e.g., custom encapsulation, deep packet inspection for IPS/IDS security systems, new network protocol support, etc.) that can change after the hardware is deployed.

Current approaches to improve the network performance of these networks includes: overprovision of the network elements; traffic engineering and shaping to optimize the flow of traffic; and network-aware placement of data. Overprovisioning the network elements increases quantity of links and link speeds. However, this approach is not a cost effective plan for worst case traffic patterns especially when those traffic patterns are dynamic. The traffic patterns are determined by the application that is running and the dataset(s) it is processing, both of which can change.

Traffic engineering and shaping to optimize the flow of traffic increases quality of service. However, this approach requires network profiling and administration that is statically setup to address the expected (i.e., average-case) network patterns.

Finally, network-aware placement of data provides a "rack-aware" approach while attempting to assign processing to servers with the dataset and on the same network switch to minimize overall network traffic of the application. However, this approach reduces the amount of network traffic for the overall datacenter without reducing the dataset the end points process.

Each of these approaches focuses on static, best-effort tuning of the existing settings of the network to increase its operation. The network itself does not make an effort to adjust its settings dynamically, nor does it attempt to use the switches' programmatic packet inspection and general computing capabilities beyond normal network traffic processing to reduce the datasets that compute nodes will have to process.

Various implementations are described below by referring to several examples of network devices to perform a reduction function on data received from a mapper engine as the data is transmitted through a network to a reducer engine. In one example implementation according to aspects of the present disclosure, a method may include receiving, by a network device, data from a mapper system. The method may then include performing, by the network device, a reduction function on the data received from the mapper system to reduce the data. The method may also include transmitting, by the network device, the reduced data to a reducer system.

In another example implementation according to aspects of the present disclosure, a network device includes a processing resource and a reduction module to perform a reduction function on data received from a mapper engine as the data is transmitted through a network to a reducer engine.

In yet another example implementation according to aspects of the present disclosure, a system may include a mapper system, a reducer system, and a network device communicatively coupled to the mapper system and the reducer system. The network device may further include a processing resource, and a reduction module to perform a reduction function on data received from the mapper system as the data is transmitted through a network to the reducer system.

In some implementations, the described reducer functionality in a network device reduces the amount of network traffic while causing increased speed in the computation of large data sets. The disclosed techniques also limit the cost of these systems and increase the speed of distributed applications by utilizing the network itself to actively participate in computation of the distributed applications. There is also an opportunity to make use of programmability offered by the processing elements in switches for application processing. Additionally, the techniques described reduce application processing time, increase the number and/or complexity of processing jobs by freeing cluster capacity, and reduce infrastructure costs due to reduced network load and increased utilization of existing resources.

Moreover, one of the unexpected benefits of this approach is that it counters the traditional approach of minimizing the number of switches or hops data flows through. Currently, each network stage is a potential congestion point and adds latency to the processing. However, with the present techniques, each hop in the network is an opportunity to process the data that is being transported and/or reduce the dataset further for some analytical distributed processing applications. This makes use of the latency incurred during transport to perform useful functions while reducing network load and congestion. These and other advantages will be apparent from the description that follows.

FIG. 1 illustrates a block diagram of a system having a network device 100 to perform a reduction function according to examples of the present disclosure. FIG. 1 includes particular components, modules, etc. according to various examples. However, in different implementations, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

In the example illustrated in FIG. 1, a MapReduce programming model is utilized in describing the reduction functionality of the network device 100 for performing operations across a distributed application in a distributed computing environment. A MapReduce programming model is composed of a map( ) procedure that performs filtering, transform, and/or sorting and a reduce( ) procedure that performs another transform or summary operation. For example, if the distributed application is performing a word count, the map function breaks the line into words and output a key/value pair for each word. Each output pair contains the word as the key and the number of instances of that word in the line as the value. In the word count example, the reduce function takes the input values (matching keys from the map function), sums them, and generates a single output of the word and the final sum. It should be understood that the word count example is fairly simple and that more complex distributed application operations may be based on a similar approach.

FIG. 1 includes a plurality of mappers 120a-d (that is, computing systems performing the map operation) and a plurality of reducers 130a-d (that is, computing systems performing the reduce operation). Although four mappers 120a-d and four reducers 130a-d are shown, any appropriate number of mappers and reducers may be utilized in different implementations.

FIG. 1 also includes a network device 100, which may be, for example, a network switch or similar device. The network device 100 includes a processing resource 110, which is shown as being four separate processing resources 110a-d. However, it should be understood that any suitable number of processing resources may be utilized, and the four shown may be combined into fewer or expanded into greater processing resources.

The processing resources 110a-110d represent generally any suitable type or form of processing unit or units capable of processing data or interpreting and executing instructions. The instructions may be stored on a non-transitory tangible computer-readable storage medium, such as a memory resource (not shown), or on any other suitable type of volatile or non-volatile memory that stores instructions to cause a programmable processor to perform the techniques described herein. Alternatively or additionally, the network device 300 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors and/or types of processors may be used, as appropriate, along with multiple memories and/or types of memory.

The network device 100 may include appropriate hardware to enable the network device 100 to be connected to a network. The network represents generally hardware components and computers interconnected by communications channels that allow sharing of resources and information. The network may include one or more of a cable, wireless, fiber optic, or remote connection via a telecommunication link, an infrared link, a radio frequency link, or any other connectors or systems that provide electronic communication. The network may include, at least in part, an Intranet, the internet, or a combination of both. The network may also include intermediate proxies, routers, switches, load balancers, and the like. The paths depicted in FIG. 1 between the various mappers 120a-d, the network device 100, and the reducers 130a-d represent the logical communication paths between these devices, not necessarily the physical paths between the devices.

The processing resources 110a-d include reduction function modules R( ) that perform a reduction function on data received from a mapper engine as the data is transmitted through a network to a reducer engine. The data inputs received by the processing resources 110a-d of the network device 100 may include key and value pairs (denoted <$K_1$, $V_1$>).

In the illustrated example, mapper 120a outputs four key/value pairs, one each to the reduction function module R( ) of processing resource 110a-d of the network switch 100, as depicted by dotted lines. Mapper 120b outputs two key/value pairs, one to the reduction function module R( ) of processing resource 110a and one to the reduction function module R( ) of processing resource 110c, as depicted by dotted lines. Mapper 120c outputs three key/value pairs, one to the reduction function module R( ) of processing resource 110a, one to the reduction function module R( ) of processing resource 110c, and one to the reduction function module R( ) of processing resource 110d, as depicted by dotted lines. Finally, Mapper 120d outputs four key/value pairs, one to the reduction function module R( ) of processing resource 110a, one to the reduction function module R( ) of processing resource 110b, and two to the reduction function module R( ) of processing resource 110d, as depicted by dotted lines.

The reduction function modules R( ) of processing resource 110a receives the four key/value data pairs from the mappers and reduces them to two reduced output key/value data pairs, then transmits the reduced key/value data pairs to reducer 130a, as depicted by the dashed lines. The reduction function module R( ) of processing resource 110b receives the two key/value data pairs from the mappers and reduces them to one reduced output key/value data pair, then transmits the reduced key/value data pair to reducer 130b, as depicted by the dashed lines. The reduction function module R( ) of processing resource 110c receives the three key/value data pairs from the mappers and reduces two of them to one reduced output key/value data pair, then transmits the reduced key/value data pair along with one un-reduced key/value pair to reducer 130c, as depicted by the dashed lines. Finally, the reduction function modules R( ) of processing resource 110d receives the four key/value data pairs from the mappers and reduces two of them to one reduced output key/value data pair, then transmits the reduced key/value data pair along with the two un-reduced key/value pairs to reducer 130d, as depicted by the dashed lines. In this example, since two of the key/value pairs from mapper 120d traversed through the processing resource 110d, the key/value pairs were not reduced. However, in other examples, the two key value pairs may have been reduced.

As illustrated in the following table, the network traffic sent between the mappers 120a-d to the reducers 130a-d is reduced significantly, while processing is performed on the data within the network device 100. The table shows results for two-value reduction, that is, reduction of two key/value pairs into one key/value pair, as depicted in FIG. 1.

| Reducer | Without Reduction Function | Two-Value Reduction | % Reduction |
|---|---|---|---|
| Reducer 130a | 4 | 2 | 50% |
| Reducer 130b | 2 | 1 | 50% |
| Reducer 130c | 3 | 2 | 33% |
| Reducer 130d | 4 | 3 | 25% |

Figure 2:
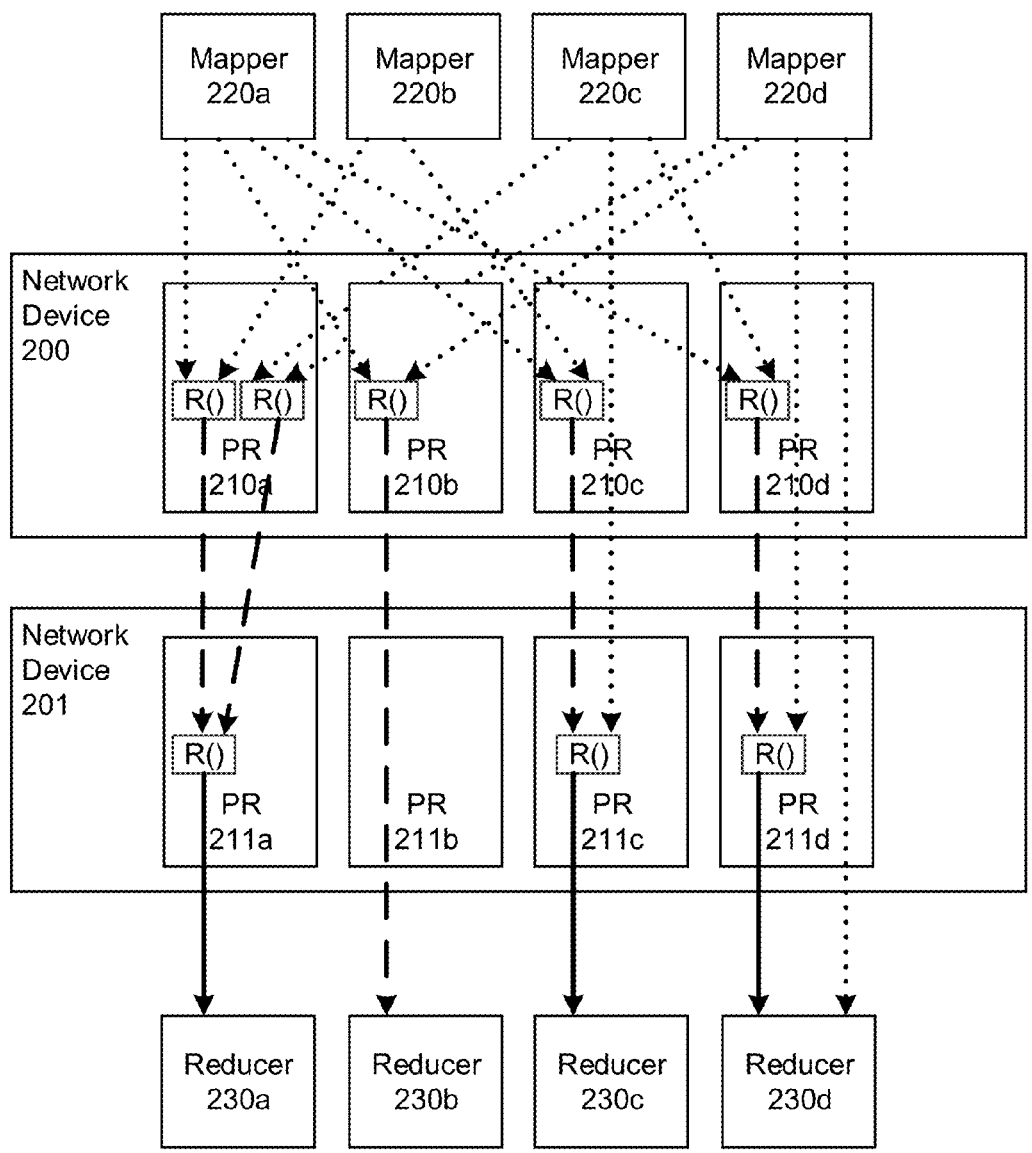
FIG. 2 illustrates a block diagram of a system having network devices to perform reduction functions according to examples of the present disclosure.

FIG. 2 illustrates a block diagram of a system having network devices 200 and 201 to perform reduction functions according to examples of the present disclosure. FIG. 2 includes particular components, modules, etc. according to various examples. However, in different implementations, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

In the example illustrated in FIG. 2, a MapReduce programming model is utilized in describing the reduction functionality of the network device 200 for performing operations across a distributed application in a distributed computing environment. A MapReduce programming model is composed of a map( ) procedure that performs filtering and sorting and a reduce( ) procedure that performs summary operation. For example, if the distributed application is performing a word count, the map function breaks the line into words and output a key/value pair for each word. Each output pair contains the word as the key and the number of instances of that word in the line as the value. In the word count example, the reduce function takes the input values, sums them, and generates a single output of the word and the final sum. It should be understood that the word count example is fairly simple and that more complex distributed application operations may be based on a similar approach.

FIG. 2 includes a plurality of mappers 220a-d (that is, computing systems performing the map operation) and a plurality of reducers 230a-d (that is, computing systems performing the reduce operation). Although four mappers 220a-d and four reducers 230a-d are shown, any appropriate number of mappers and reducers may be utilized in different implementations.

FIG. 2 also includes two network devices 200 and 201, which may be, for example, a network switch or similar device. The network devices 200 and 201 include a processing resource 210 and 211 respectively, which are shown as being four separate processing resources 210a-d and 211a-d. However, it should be understood that any suitable number of processing resources may be utilized, and the four shown may be combined into fewer or expanded into greater processing resources. It should also be understood that the networking devices 200 and 201 may differ for the same flow of traffic. For example, more complicated transformations and/or additional steps of reduction may be applied. Moreover, in examples, it may be determined that two or more network devices may be needed to implement a particular reduction function. In this case, a software defined network may dynamically direct traffic to the appropriate network devices configured to perform the reduction function.

The processing resources 210a-210d of network device 200 represent generally any suitable type or form of processing unit or units capable of processing data or interpreting and executing instructions. The instructions may be stored on a non-transitory tangible computer-readable storage medium, such as a memory resource (not shown), or on any other suitable type of volatile or non-volatile memory that stores instructions to cause a programmable processor to perform the techniques described herein. Alternatively or additionally, the network device 200 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors and/or types of processors may be used, as appropriate, along with multiple memories and/or types of memory.

The network devices 200 and 201 may include appropriate hardware to enable the network devices 200 and 201 to be connected to a network. The network represents generally hardware components and computers interconnected by communications channels that allow sharing of resources and information. The network may include one or more of a cable, wireless, fiber optic, or remote connection via a telecommunication link, an infrared link, a radio frequency link, or any other connectors or systems that provide electronic communication. The network may include, at least in part, an Intranet, the internet, or a combination of both. The network may also include intermediate proxies, routers, switches, load balancers, and the like. The paths depicted in FIG. 2 between the various mappers 220a-d, the network device 200, and the reducers 230a-d represent the logical communication paths between these devices, not necessarily the physical paths between the devices.

The processing resources 210a-d include reduction function modules R( ) that perform a reduction function on data received from a mapper engine as the data is transmitted through a network to a reducer engine. The data inputs received by the processing resources 210a-d of the network device 200 may include key and value pairs (denoted $<K_1, V_1>$).

In the illustrated example, mapper 220a outputs four key/value pairs, one each to the reduction function module R( ) of processing resource 210a-d of the network switch 200, as depicted by dotted lines. Mapper 220b outputs two key/value pairs, one to the reduction function module R( ) of processing resource 210a and one to the reduction function module R( ) of processing resource 210c, as depicted by dotted lines. Mapper 220c outputs three key/value pairs, one to the reduction function module R( ) of processing resource 210a, one to the reduction function module R( ) of processing resource 210c, and one to the reduction function module R( ) of processing resource 210d, as depicted by dotted lines. Finally, Mapper 220d outputs four key/value pairs, one to the reduction function module R( ) of processing resource 210a, one to the reduction function module R( ) of processing resource 210b, and two to the reduction function module R( ) of processing resource 210d, as depicted by dotted lines.

The reduction function modules R( ) of processing resource 210a receives the four key/value data pairs from the mappers and reduces them to two reduced output key/value data pairs, then transmits the reduced key/value data pairs to the processing resource 211a of network device 201, as depicted by the dashed lines. The reduction function module R( ) of the processing resource 211a of the network device 201 then receives the two reduced key/value pairs from the network device 200 and further reduces them to a single key/value pair, which is transmitted to reducer 230a, as depicted by the solid line.

The reduction function module R( ) of processing resource 210b receives the two key/value data pairs from the mappers and reduces them to one reduced output key/value data pair, then transmits the reduced key/value data pair to the processing resource 211b of network device 201, as depicted by the dashed lines. The reduction function module R( ) of the processing resource 211a of the network device 201 then receives the reduced key/value pair from the network device 200 and passes them along to reducer 230b, as depicted by the solid line, since no additional reduction at the network device level is needed.

The reduction function module R( ) of processing resource 210c receives the three key/value data pairs from the mappers and reduces two of them to one reduced output key/value data pair, then transmits the reduced key/value data pair along with one un-reduced key/value pair to the processing resource 211a of network device 201, as depicted by the dashed lines. The reduction function module R( ) of the processing resource 211c of the network device 201 then receives the reduced key/value pair and the passed through, un-reduced key/value pair from the network device 200 and further reduces them to a single key/value pair, which is transmitted to reducer 230c, as depicted by the solid line.

Finally, the reduction function modules R( ) of processing resource 210d receives the four key/value data pairs from the mappers and reduces two of them to one reduced output key/value data pair, then transmits the reduced key/value data pair along with the two un-reduced key/value pairs to the processing resource 211d of network device 201, as depicted by the dashed lines. In this example, since two of the key/value pairs from mapper 220d traversed through the processing resource 210d, the key/value pairs were not reduced. The reduction function module R( ) of the processing resource 211d of the network device 201 then receives the reduced key/value pair and the two passed through, un-reduced key/value pairs from the network device 200 and further reduces the already reduced key/value pair along with one of the previously un-reduced key/value pairs to a single key/value pair, which is transmitted to reducer 230a, as depicted by the solid line, along with an un-reduced key/value pair.

It should be understood that, although the examples shown in FIGS. 1 and 2 utilize a reducer function R( ) that reduces two values into a single value, it is possible to reduce greater numbers of values. Thus, the reduction of two values should not be seen as limiting. In other examples, the number of values that could be reduced might vary depending on several factors, including: the processing and memory capabilities of the network device; the availability of data in the network to capture and reduce; and/or the delay allowable in transmitting the data to the reducers.

Figure 3:
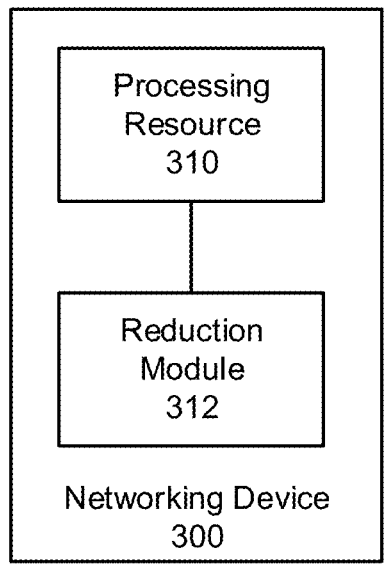
FIG. 3 illustrates a block diagram of a network device to perform a reduction function according to examples of the present disclosure.

FIG. 3 illustrates a block diagram of a network device to perform a reduction function according to examples of the present disclosure. It should be understood that the network device 300 may include any appropriate type of networking or computing device, including for example network switches, network routers, network hubs, smartphones, tablets, desktops, laptops, workstations, servers, smart monitors, smart televisions, digital signage, scientific instruments, retail point of sale devices, video walls, imaging devices, peripherals, or the like.

The network device 300 may include a processing resource 310 that represents generally any suitable type or form of processing unit or units capable of processing data or interpreting and executing instructions. The instructions may be stored on a non-transitory tangible computer-readable storage medium, such as a memory resource (not shown), or on any other suitable type of volatile or non-volatile memory that stores instructions to cause a programmable processor to perform the techniques described herein. Alternatively or additionally, the network device 300 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors and/or types of processors may be used, as appropriate, along with multiple memories and/or types of memory.

The network device 300 may include appropriate hardware to enable the network device 300 to be connected to a network. The network represents generally hardware components and computers interconnected by communications channels that allow sharing of resources and information. The network may include one or more of a cable, wireless, fiber optic, or remote connection via a telecommunication link, an infrared link, a radio frequency link, or any other connectors or systems that provide electronic communication. The network may include, at least in part, an Intranet, the internet, or a combination of both. The network may also include intermediate proxies, routers, switches, load balancers, and the like.

In examples, the processing resource 310 inspects and modify packets and executes programs on the data as the data is transmitted through the network. The processing resource 310 may include programmable network processors (NPUs) and/or embedded central processing units (CPUs). These programmable elements enable network-specific features, such as reduction functionality, to be applied to data packets at high rates within the network device 310. For example, and in addition to reduction functionality, these NPUs and/or CPUs enable deep packet inspection for IPS/IDS security systems, new network protocol support, and the like, and can change after the network device 300 is deployed.

In addition to the processing resource 310, the network device 300 may include a reduction module 312. The modules described herein may be a combination of hardware and programming. The programming may be processor executable instructions stored on a tangible memory resource such as a memory resource, and the hardware may include processing resource 310 for executing those instructions. Thus a memory resource can be said to store program instructions that, when executed by the processing resource 310, implement the modules described herein. Other modules may also be utilized as will be discussed herein.

The reduction module 312 performs a reduction function on data received from a mapper engine as the data is transmitted through a network to a reducer engine. The reduction module 312 receives, for example, data inputs from a mapper. In examples, the mapper may be a computing system to perform a map (i.e., map( )) procedure that performs filtering, transform, and sorting operations on a dataset. The data inputs received by the reduction module 312 of the network device 300 may include key and value pairs (denoted $<K_1, V_1>$).

After the reduction module 312 receives the data inputs (e.g., key and value pairs), the reduction module 312 performs a reduction function on the data inputs received from the mapper engine as the data is transmitted through the network to a reducer engine. For example, if two key and value pairs are received by the reduction module 312, the two key and value pairs may be reduced to a single key and value pair and then transmitted to the reducer, which may then perform a reduce (e.g., reduce( )) procedure that performs summary operations on the received data set. In this way, the network device reduces network traffic as well as the processing load on the reducer because a round of reducing is performed by the network device.

In examples, the reduction module 312 may further include a software reduction agent to recognize the initiation of a distributed application job and to orchestrate the acceleration responsive to determining to apply the reduction function at the network device. The software reduction agent can be part of common job submission program the client must interact with or a program running on the network devices themselves to detect these distributed processing jobs. In the Software Defined Networking (SDN) paradigm the SDN controller could automatically detect network flows for new processing jobs from a centralized view of the distributed computing environment. It is also possible new programing models directly recognize the use of switch processing in the over application and can target their use directly.

The reduction module 312 may further include a network compiler, which may be initiated by the software reduction agent with details of the job (e.g., which compute nodes are involved in the job, the network topology and data flow path, metadata relating to the job, the program the compute nodes will execute, etc.). The network compiler may then translate at least part of the distributed application processing program to a program that can execute on the network device (and any other network devices such as switches in the network path, as appropriate). In examples, the network compiler may also be a network cross-compiler.

The reduction module 312 may also include a network profiler, which may be initiated by the software reduction agent, to determine whether to apply the reduction function at the network device, for example, based on the job characteristics, capabilities of the devices in the expected network path, and other information received by the software reduction agent.

At this point, the software reduction agent facilitates the setup of the network devices by loading the translated program and network flows based on the recommendation of the network profiler. The reduction module 312, utilizing the processing resource 310, performs the reduction function on data received from a mapper engine as the data is transmitted through a network to a reducer engine.

Although this represents only one example configuration with variations, the described process and functionality utilizes the computing resources within the network device 300 (both physical and virtual) to process the distributed application data as it flows through network devices to reduce the amount of data compute nodes operate on when data is received and transmitted through the network. In this way, the amount of data flowing through the network is reduce, while the overall compute time for completing the job is reduced.

Figure 4:
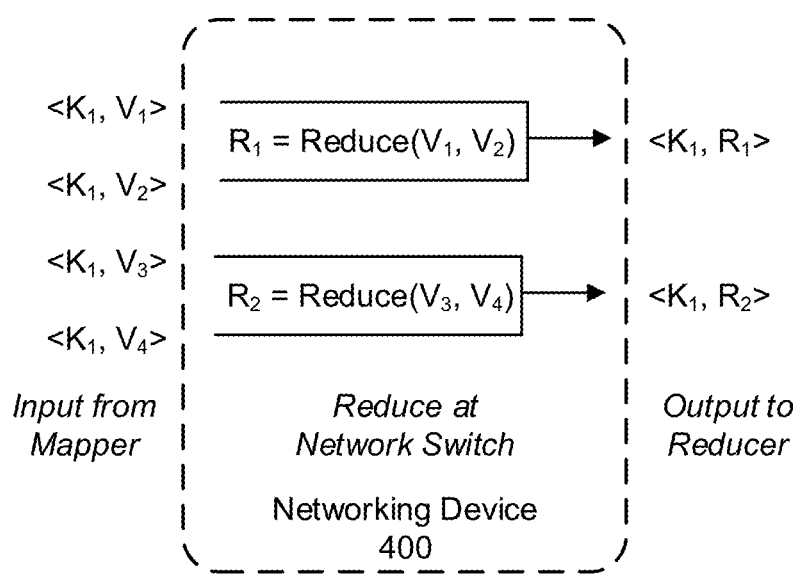
FIG. 4 illustrates a block diagram of reducing data in a network device according to examples of the present disclosure.

FIG. 4 illustrates a block diagram of reducing data in a network device 400 according to examples of the present disclosure. In this example, four inputs, <Key, Value>, are received from a mapper (i.e., a computing system to perform a mapper function), the four inputs being: $<K_1, V_1>$, $<K_1, V_2>$, $<K_1, V_3>$, and $<K_1, V_4>$.

Once the inputs are received at the network device, the network device performs a data reduction function on the received inputs. In this example, the first two inputs $<K_1, V_1>$ and $<K_1, V_2>$ are reduced by reducer function $R_1=\text{Reduce}(V_1, V_2)$. Similarly, the second two inputs $<K_1, V_3>$ and $<K_1, V_4>$ are reduced by reducer function $R_2=\text{Reduce}(V_3, V_4)$. By applying these two reducer functions $R_1$ and $R_2$, the four inputs received by the network device are reduced to two outputs that are output by a network device to a reducer (i.e., a computing system to perform a reducer function). Thus, four inputs are reduced to two outputs. In this way, network traffic is reduced as is the processing load of the reducer because a round of reducing is performed by the network device. It should be understood that, although only one mapper at one reducer are discussed, multiple mappers and/or multiple reducers may be employed such that the input can be received from multiple different mappers and the network device can output the reduced data to multiple different reducers.

Figure 5:
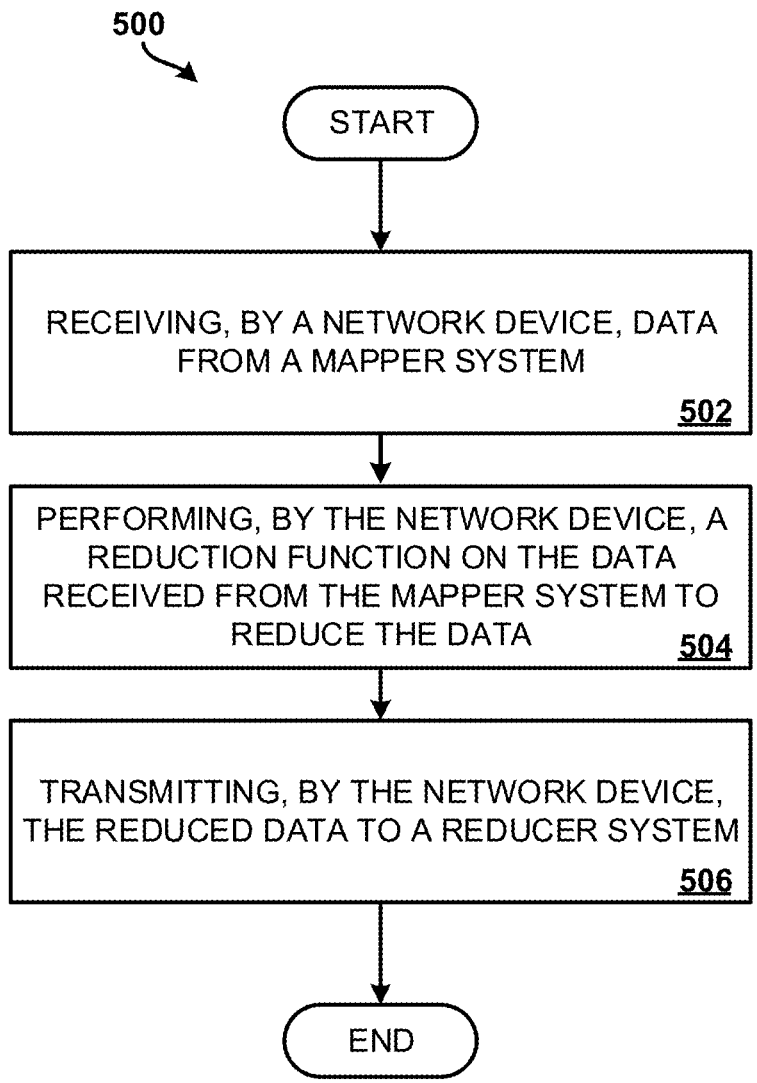
FIG. 5 illustrates a flow diagram of a method for performing reduction functions in a network device according to examples of the present disclosure.

FIG. 5 illustrates a flow diagram of a method 500 for performing reduction functions in a network device according to examples of the present disclosure. The method 500 may be executed by a computing system or a computing device such as network device 100 of FIG. 1, network devices 200 and/or 201 of FIG. 2, and network device 300 of FIG. 3 or may be stored as instructions on a non-transitory computer-readable storage medium that, when executed by a processor, cause the processor to perform the method 500. In one example, method 500 may include: receiving, by a network device, data from a mapper system (block 502); performing, by the network device, a reduction function on the data received from the mapper system to reduce the data (block 504); and transmitting, by the network device, the reduced data to a reducer system (block 506).

At block 502, the method 500 includes, for example, receiving, by a network device (e.g., network device 100 of FIG. 1, network devices 200 and/or 201 of FIG. 2, and network device 300 of FIG. 3), data from a mapper system. The mapper system may perform a map operation on a data set and output the results of the map function to a reduce system communicatively coupled to the mapper system via a network, which includes the network device. Thus, data transmitted from the mapper system to the reducer system flows through the network device. The method 500 continues to block 504.

At block 504, the method 500 includes, for example, performing, by the network device, a reduction function on the data received from the mapper system to reduce the data. The reduction function receives data, such as key and value pairs, and reduces them as appropriate. For example, and as illustrated in FIG. 4, two inputs $<K_1, V_1>$ and $<K_1, V_2>$ may be reduced by reducer function $R_1=Reduce(V_1, V_2)$, and similarly, two additional inputs $<K_1, V_3>$ and $<K_1, V_4>$ may be reduced by reducer function $R_2=Reduce(V_3, V_4)$. By applying these two reducer functions $R_1$ and $R_2$, the four inputs received by the network device are reduced to two outputs that are output by a network device to a reducer (i.e., a computing system to perform a reducer function). Thus, four inputs are reduced to two outputs. In this way, network traffic is reduced as is the processing load of the reducer because a round of reducing is performed by the network device.

In examples, performing the reduction function on the data may include additional elements. For example, a software reduction agent of the network device, may recognize the initiation of a distributed application job. A network compiler of the network device may then translate the distributed application job to a program running on the network device. The software reduction agent of the network device, then determines if data reduction is possible, and if so, the software reduction agent sets up the network device by loading the translated program running on the network device based on a recommendation by the software reduction agent. Then, a processing resource of the network device, reduces the data as it flows through the network device from the mapper system to the reducer system. The method 500 continues to block 506.

At block 506, the method 500 includes, for example, transmitting, by the network device, the reduced data to a reducer system. Once the network device performs the reduction function, the reduce data, as well as any data that was not reduce, may be transmitted to the reducer system, as appropriate.

Additional processes also may be included, and it should be understood that the processes depicted in FIG. 5 represent illustrations, and that other processes may be added or existing processes may be removed, modified, or rearranged without departing from the scope and spirit of the present disclosure.

It should be emphasized that the above-described examples are merely possible examples of implementations and set forth for a clear understanding of the present disclosure. Many variations and modifications may be made to the above-described examples without departing substantially from the spirit and principles of the present disclosure. Further, the scope of the present disclosure is intended to cover any and all appropriate combinations and sub-combinations of all elements, features, and aspects discussed above. All such appropriate modifications and variations are intended to be included within the scope of the present disclosure, and all possible claims to individual aspects or combinations of elements or steps are intended to be supported by the present disclosure.

What is claimed is:

1. A method comprising:
   receiving, by a network switch, a packet from a mapper system;
   inspecting, at the network switch, the packet to extract the data;
   performing, by the network switch, a reduction function on the data extracted from the packet received from the mapper system to reduce the data; and
   transmitting, by the network switch, the reduced data to a reducer system.

2. The method of claim 1, wherein performing the reduction function on the data further comprises:
   recognizing, by a software reduction agent of the network switch, the initiation of a distributed application job.

3. The method of claim 2, wherein performing the reduction function on the data further comprises:
   translating; by a network compiler of the network switch, the distributed application job to a program running on the network device.

4. The method of claim 3, wherein performing the reduction function on the data further comprises:
   determining, by the software reduction agent of the network switch, if data reduction is possible.

5. The method of claim 4, wherein performing the reduction function on the data further comprises:
   responsive to determining that data reduction is possible, setting up the network switch by loading the translated program running on the network switch based on a recommendation by the software reduction agent.

6. The method of claim 5, wherein performing the reduction function on the data further comprises
   reducing, by a processing resource of the network switch, the data as it flows through the network switch from the mapper system to the reducer system.

7. A network device comprising:
   a processing resource; and
   a reduction module to perform a reduction function on data received from a mapper engine as the data is transmitted through a network to a reducer engine;
   wherein the reduction module comprises a network compiler to translate at least a part of a program that executes on the processing resource for an application to a packet processor instruction set of the network device.

8. The network device of claim 7, wherein the processing resource is to inspect and modify packets and execute programs on the data as the data is transmitted through the network.

9. The network device of claim 7, wherein the reduction module further comprises:
   a network profiler to determine whether to apply the reduction function at the network device.

10. The network device of claim 9, wherein the reduction module further comprises:
    a software agent to orchestrate the reduction function responsive to determining to apply the reduction function at the network device.

11. The network device of claim 7, wherein the network device comprises a switch.

12. A system comprising:
    a mapper system;
    a reducer system; and
    a switch communicatively coupled to the mapper system and the reducer system, further comprising:

a processing resource; and
a reduction module to perform a reduction function on data received from the mapper system as the data is transmitted through the switch to the reducer system.

13. The system of claim 12, further comprising:
a second switch communicatively coupled to the mapper system, the reducer system, and the network device, the second switch further comprising:
a processing resource; and
a reduction module to perform a reduction function on data received from the network device as the data is transmitted through the second switch to the reducer system.

14. The system of claim 12, wherein the processing resource is to inspect and modify packets and execute programs on the data as the data is transmitted through the switch.

15. The system of claim 12, wherein the reduction module further comprises:
a network compiler to translate at least a part of a program that executes on the processing resource for an application to a packet processor instruction set of the network device;
a network profiler to determine whether to apply the reduction function at the switch; and
a software agent to orchestrate the reduction responsive to determination to apply the reduction function at the switch.

* * * * *